United States Patent [19]
Outterside

[11] Patent Number: 5,910,247
[45] Date of Patent: Jun. 8, 1999

[54] TWO ELEMENT FILTER BAG

[76] Inventor: W. Mark Outterside, 8581 Mosely, Houston, Tex. 77075

[21] Appl. No.: 08/926,524

[22] Filed: Sep. 8, 1997

[51] Int. Cl.$^6$ .................................................. B01D 39/00
[52] U.S. Cl. .................. 210/487; 210/493.1; 210/493.5; 210/494.1; 210/497.01; 55/334; 55/335; 55/368
[58] Field of Search .................................. 210/448, 452, 210/487, 493.1, 493.5, 494.1, 497.01; 55/334, 335, 368

[56] References Cited

U.S. PATENT DOCUMENTS

| | | |
|---|---|---|
| 2,278,603 | 4/1942 | Williams . |
| 2,314,640 | 3/1943 | Winslow et al. . |
| 2,332,188 | 10/1943 | Andrews .................................. 210/165 |
| 2,539,768 | 1/1951 | Anderson . |
| 2,613,814 | 10/1952 | Moore . |
| 2,946,449 | 7/1960 | Shaw . |
| 3,050,189 | 8/1962 | Williams .................................. 210/232 |
| 4,056,374 | 11/1977 | Hixenbaugh . |
| 4,231,770 | 11/1980 | Johnson, Jr. . |
| 4,280,826 | 7/1981 | Johnson, Jr. . |
| 4,297,115 | 10/1981 | Johnson, Jr. . |
| 4,304,580 | 12/1981 | Gehl et al. . |
| 4,324,571 | 4/1982 | Johnson, Jr. . |
| 4,574,047 | 3/1986 | Rosaen .................................. 210/130 |
| 4,610,787 | 9/1986 | Morgan et al. ..................... 210/497.01 |
| 5,152,890 | 10/1992 | Linnersten ................................ 210/315 |
| 5,651,765 | 7/1997 | Haworth et al. ..................... 210/493.1 |

*Primary Examiner*—David A. Reifsnyder
*Attorney, Agent, or Firm*—Keeling Law Firm

[57] ABSTRACT

My invention comprises a two element filter bag which includes a cylindrical outer element, a generally tubular inner element, a joining means, a securing means, and a diverting means. Cylindrical outer element is hollow, constructed of suitable filter media, and has first and second open ends. Tubular inner element is also hollow, constructed of suitable filter media, and has one closed end and one open end. Tubular inner element is positioned within cylindrical outer element so that the first open end of the outer element is generally coplanar with the closed end of the inner element, and the second open end of the outer element is generally coplanar with the open end of the inner element. Joining means joins the second open end of the outer element to the open end of the inner element. Supporting means is positioned within the inner element through open inner element end and provides support to inner element. Diverting means uniformly diverts the process flow entering the filter bag through first open outer element end throughout the interior of the filter bag. Preferably, diverting means comprises a cone shaped inner element closed end. Process flow is filtered by the filter bag when the flow collides with and permeates through the inside surface of the outer element and the outside surface of the inner element.

17 Claims, 3 Drawing Sheets

TWO ELEMENT FILTER BAG

BACKGROUND OF THE INVENTION

1. Field of Invention

This invention relates to filtration systems which separate solids from liquids in process flows. More specifically, this invention is an improved, low-cost filter bag used to remove solids from industrial process flows.

The invention includes a greater amount of filter media surface area than comparably sized prior art filter bags, provides the additional surface area without a corresponding restriction in flow, includes a means by which the growth of the layer of solids retained within the filter bag is uniform throughout the length of the filter bag, and is capable, without collapsing upon itself, of being cleaned by reversing the direction of the process flow. The invention may be utilized in a variety of chemical and/or industrial process flow applications requiring filtration as long as the filter bag is constructed from the appropriate filter media for each flow.

Generally, filter bags are used in industrial process flows to separate solids from liquids. Being permeable only to particles which are smaller than a pre-determined, specific size, the filter bag retains any solid particles in the process flow which are larger than the specific size. On the other hand, any particles which are the specific size or smaller (usually only liquid particles) permeate through the filter bag and continue in the flow. The micron rating of the filter media from which the filter bag is constructed dictates the particle sizes which will be retained by the filter bag and which will permeate through the bag.

During the life of the filter bag, as more solids accumulate, a layer of solids is formed within the filter bag. As the layer becomes thicker, the layer of solids becomes a substantial restriction to the flow of process through the filter bag, and the filter bag must then be replaced or cleaned (hereinafter referred to as the "critical thickness").

It is axiomatic that an increase in the size or surface area of the filter bag provides a corresponding increase in the quantity of solids retained by the filter bag. In addition, an increase in the surface area of the filter bag also increases the usable life of the filter bag by prolonging the time it takes the filter bag to reach the critical thickness of solids. Thus, it is advantageous to maximize the surface area of the filter bag.

However, several limitations exist in maximizing the amount of surface area of a filter bag. First, in order to be used in most, if not all, of the existing process flow equipment and systems, a filter bag must have a specific shape and certain dimensions. Second, as surface area is added to the filter bag (by way of folds or layers to the filter bag), the additional surface area itself tends to act as a restriction to the flow by providing too many obstructions within the filter bag.

The key then is to maximize the filter media surface area without restricting the flow of process through the filter bag. It would thus be advantageous to construct a filter bag which maximizes the filter media surface area without restricting the flow of process through the filter bag.

Another problem inherent in prior art filter bags is that the layer of solids heretofore described tends to concentrate in only one section of the prior art bags. For instance, in the standard type of tubular shaped filter bag, the process flow enters the bag through the bag's open end and exits the bag through the bag's closed end. The great majority of the process flow exits the bag and is filtered by the bag's closed end. Naturally, the layer of solids builds up primarily at the bag's closed end. Since the layer of solid accumulates and grows primarily at one section of the filter bag, the layer grows quickly and reaches the critical thickness of solids much more rapidly than if the layer of solids builds up uniformly throughout the length of the filter bag. It would thus be advantageous to design a filter bag in which the growth of the layer of solids is uniform throughout the length of the filter bag thereby extending the time for the formation of the critical thickness of solids.

In addition, the majority of prior art filter bags can be cleaned only by removing the bags from the process flow equipment and system. Although this cleaning method is prevalent in the field of art, the method can be improved since it ordinarily requires a shut down of the process flow thereby resulting in time and monetary loss to the operator of the facility. It would thus be advantageous to devise a filter bag (and method) which can be cleaned without the need to remove the filter bag from the process flow equipment and system.

A technique sometimes used to clean filter bags which does not require their removal from the process equipment and system is a "backwash operation." During the backwash operation, the process flow is reversed through the filter bag and the solids retained within the filter bag during normal operation are thereby dislodged. This technique, however, is not widely used since, among other reasons, prior art filter bags constructed of flexible filter media tend to collapse once the backwash operation is in effect. It would thus be advantageous to construct a filter bag made of flexible filter media which may be cleaned by a backwash operation and does not collapse during the backwash operation.

2. Related Art

Filter bags and other such filtration mechanisms have long been known to the prior art. Illustrative of such devices are U.S. Pat. No. 2,278,603 issued to Williams in 1942, U.S. Pat. No. 2,314,640 issued to Winslow et al. in 1943, U.S. Pat. No. 2,539,768 issued to Anderson in 1951, U.S. Pat. No. 2,613,814 issued to Moore in 1952, U.S. Pat. No. 2,946,449 issued to Shaw in 1960, U.S. Pat. No. 4,056,374 issued to Hixenbaugh in 1977, U.S. Pat. No. 4,231,770 issued to Johnson, Jr. in 1980, U.S. Pat. No. 4,280,826 issued to Johnson, Jr. in 1981, U.S. Pat. No. 4,297,115 issued to Johnson, Jr. in 1981, U.S. Pat. No. 4,304,580 issued to Gehl et al. in 1981, and U.S. Pat. No. 4,324,571 issued to Johnson, Jr. in 1982.

U.S. Pat. No. 2,278,603 issued to Williams discloses a filter which is at least partially cylindrical in shape. For the purpose of increasing the filter media surface area, the cylindrically shaped filter includes inwardly projecting folds. The inner edges of the folds define the outline of a cone and the depth of the folds increases progressively upwardly. However, the Williams Patent does not disclose, among others, a means by which the growth of the layer of solids within the filter is uniform throughout its length.

The Hixenbaugh Patent discloses a tubular gas filter bag; however, the Hixenbaugh bag does not include, among others, additional filter media surface area (as compared against similarly sized filter bags) or a means by which the growth of the layer of solids within the filter is uniform throughout its length.

Lastly, the family of Johnson, Jr. Patents all disclose a bag type gas filter with at least one supporting structure located within the bag. The supporting structures permit the bags to be cleaned by reversing flow through the filter media. However, the Johnson, Jr. inventions do not include, among others, additional filter media surface area (as compared against similarly sized filter bags).

Though the above mentioned inventions may be helpful for their stated purpose, they can be improved to provide a filter bag for industrial process flows which includes a greater amount of filter media surface area than comparably sized prior art filter bags, includes the additional surface area without a corresponding restriction in the flow, includes a means by which the growth of the layer of solids retained within the filter bag is uniform throughout the length of the filter bag, and is capable, without collapsing upon itself, of being cleaned by reversing the direction of the process flow.

SUMMARY OF THE INVENTION

Accordingly, the objectives of this invention are to provide, inter alia, a filter bag that:

possesses a greater amount of filter media surface area than comparably sized prior art filter bags;

includes the additional filter media surface area without a corresponding restriction in the process flow;

includes a means by which the growth of the layer of solids within the filter bag is uniform throughout the length of the filter bag;

can be cleaned without having to be removed from the process flow filtering equipment and system; and can be cleaned, without collapsing upon itself, by reversing the direction of the process flow.

Other objects of the invention will become apparent from time to time throughout the specification and claims as hereinafter related.

To achieve such improvements, my invention comprises a two element filter bag which includes a cylindrical outer element, a generally tubular inner element, a joining means, a securing means, and a diverting means. Cylindrical outer element is hollow, constructed of suitable filter media, and has a first and a second open end. Tubular inner element is also hollow, constructed of suitable filter media, and has one closed end and one open end. Tubular inner element is positioned within cylindrical outer element so that the first open end of the outer element is generally coplanar with the closed end of the inner element, and the second open end of the outer element is generally coplanar with the open end of the inner element. Joining means joins the second open end of the outer element to the open end of the inner element. Supporting means is positioned within the inner element through open inner element end and provides support to inner element. Diverting means uniformly diverts the process flow entering the filter bag through first open outer element end throughout the interior of the filter bag. Preferably, diverting means comprises a cone shaped inner element closed end. Process flow is filtered by the filter bag when the flow collides with and permeates through the inside surface of the outer element and the outside surface of the inner element.

BRIEF DESCRIPTION OF THE DRAWINGS

The manner in which these objectives and other desirable characteristics can be obtained is explained in the following description and attached drawings in which.

DETAILED DESCRIPTION OF THE INVENTION

My invention is illustrated in FIGS. 1 through 13 and the two element filter bag is depicted as 10.

Figure 1:
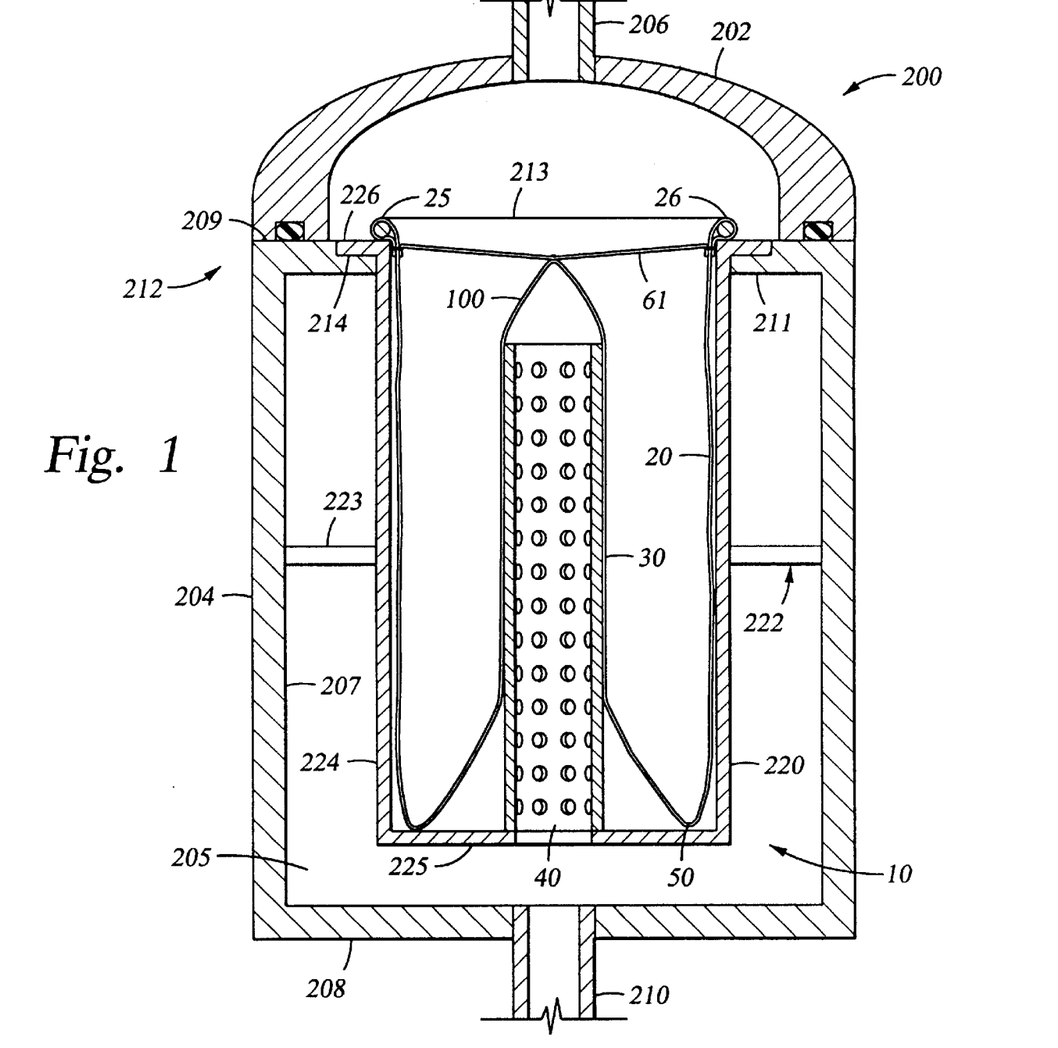
FIG. 1 is an cross-sectional view of the two element filter bag positioned within a commonly known filter vessel.
Figure 2:
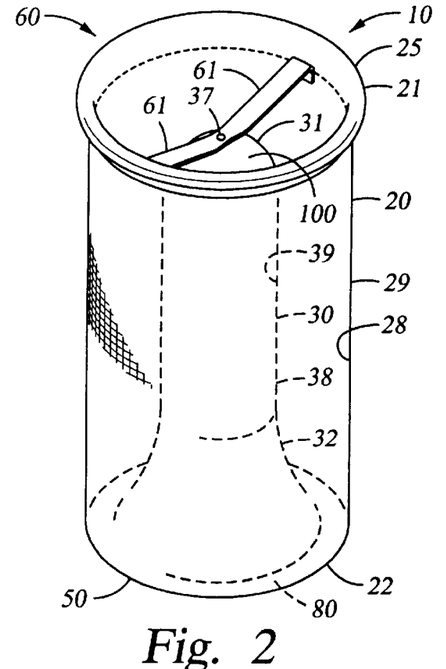
FIG. 2 is an isometric view of the two element filter bag with outer element first end at the top of the Figure and showing inner element with hidden lines.
Figure 3:
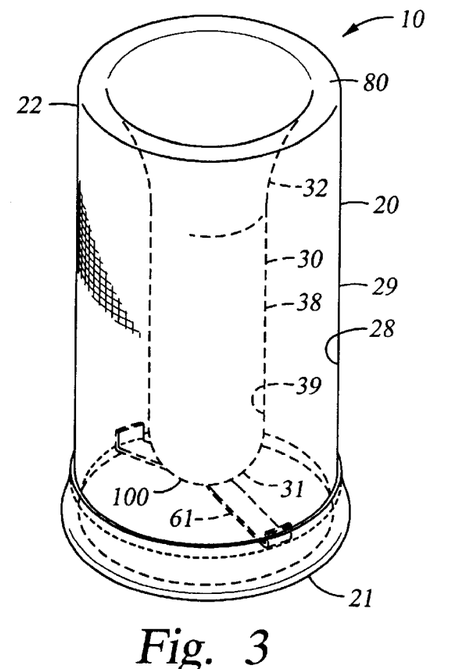
FIG. 3 is an isometric view of the two element filter bag with outer element first end at the bottom of the Figure and showing inner element with hidden lines.

Generally, as shown in FIG. 1, filter bag 10 is positioned in a filter vessel 200 commonly known in the field of art. Filter vessel 200 includes a filter vessel lid 202 and a filter vessel container 204. Filter vessel lid 202 includes a process flow inlet 206. Filter vessel container 204 is hollow thereby defining a container inner cavity 205. Filter vessel container 204 includes a container top surface 209, a container top opening 213, and a container bottom 208 having a process flow outlet 210. Filter vessel lid 202 is sealingly attached to filter vessel container 204 by way of lid attachment means 212. Preferably, lid attachment means 212 comprises a bolt, nut, and seal mechanism (not shown but commonly known in the prior art) adequate to provide a seal between filter vessel lid 202 and filter vessel container 204.

Container top surface 209 also includes a container top surface lip 211 which extends into and defines container top opening 213, making container top opening 213 circular in shape. Circular container top opening 213 is generally concentric with filter vessel container 204. Furthermore, container top surface lip 211 includes a container top surface groove 214 which lines the circumference of circular container top opening 213.

A basket 220, which is preferably generally cylindrical in shape, is slidably insertable and positioned within filter vessel container 204 through container top opening 213. Thus, in order to fit through container top opening 213, the diameter of the cross-section of basket 220 is slightly smaller than the diameter of container top opening 213. Basket 220 is rigid, and is constructed of a permeable material, such as perforated stainless steel, carbon steel, or polypropylene. The selection of the material from which the basket 220 is constructed depends, among other things, on the chemistry (ie. acidity) and density of the process flow.

Basket 220 comprises a basket wall 224 and a basket bottom 225. Basket 220 further comprises a basket lip 226 extending radially outward from the end of basket 220 distal basket bottom 225. Basket lip 226 is sized and constructed so that it securely fits onto container top surface groove 214. Thus, basket 220 is suspended within filter vessel container 204 from container top surface groove 214 and may be selectively slidably insertable into and positioned within filter vessel container 204.

Filter vessel 200 may further include a basket alignment means 222 to ensure the proper alignment of basket 220 within filter vessel container 204. Preferably, basket alignment means 222 comprises at least one bracket 223 permanently attached to the container interior wall 207. The brackets 223 are sized and constructed to abut basket wall 224 when basket 220 is positioned within filter vessel container 204. As basket 220 is inserted into filter vessel container 204 through container top opening 213, brackets 223 serve to align and maintain basket 220 in its generally concentric position.

Filter bag 10 is positioned within and supported by basket 220. Generally, when basket 220 is positioned within filter vessel container 204 (ie. when basket lip 211 is situated on container top surface groove 214), one end of filter bag 10 is suspended from the upperside of basket lip 226 with the remainder of the filter bag 10 falling into and being supported by basket 220. Thus, since filter bag 10 encircles the entire container top opening 213, all process flow entering filter vessel 200 must pass through circular top opening 213 and filter bag 10 in order to exit filter vessel 200.

As best shown in FIGS. 1–5, filter bag 10 generally comprises an outer element 20, an inner element 30, supporting means 40, joining means 50, and diverting means 100.

Outer element 20 is constructed of filter media suitable to filter the contents of the process flow in which the filter bag 10 is used. Suitable filter media include composite textile liquid filter media, such as 100% spun polypropylene or polyester, rated at one of a range of microns. The media is normally composed of three layers, an outer layer and inner layer with spun bonded non woven fabric and one central layer with melt blown non woven fabric. Preferably, the micron rating of the filter media is absolute (rated at 99% efficiency) as opposed to nominal (rated at less than 99% efficiency). However, the appropriate type of filter media and micron rating used on the filter bag 10 will depend on the application of the filter bag 10 and the contents of the process flow in which the filter bag 10 is used. It is understood that the scope of this invention also encompasses non-textile and rigid filter media. Preferably, however, the filter media used is flexible and resilient. Outer element 20 is preferably cylindrical in shape and is hollow. Outer element 20 includes an outer element first end 21, an outer element second end 22, an outer element outside surface 29, and an outer element inside surface 28. Outer element first and second ends, 21 and 22, are open. Preferably, outer element 20 is constructed of a single piece of filter media which is sewn together (not shown) into the hollow, cylindrical shape shown in the Figures and described herein.

In order to be utilized within filter vessel 200, the dimensions of outer element 20 are sized so that filter bag 10 may be suspended from basket lip 226 (as previously disclosed) at one end with the remainder of the filter bag 10 falling into and being supported by basket 220. Thus, the cross-sectional diameter of outer element 20 is preferably slightly smaller than both the cross-sectional diameter of basket 220 and the diameter of container top opening 213 (which is defined by container top surface lip 211). Furthermore, the length of outer element 20 is preferably slightly smaller than the length of basket 220. Therefore, when filter bag 10 is suspended from basket lip 226 and is in place within basket 220, basket wall 224 substantially abuts outer element outside surface 29, and basket bottom 225 substantially abuts outer element second end 22. Of course, the dimensions of the filter bag 10 will vary depending on the dimensions of the filter vessel 200 and the filter vessel basket 220 utilized in the process flow.

Outer element 20 also preferably includes a shaping means 25 which provides and maintains the cylindrical shape of outer element's 20 flexible filter media (in the preferred embodiment) In order to provide and maintain such shape, shaping means 25 is constructed of a rigid material such as stainless steel, carbon steel, or polypropylene. The selection of the material from which the shaping means 25 is constructed depends, among other things, on the chemistry (ie. acidity) and density of the process flow. Shaping means 25 is preferably sized and constructed so that it may rest on the basket lip 226 of filter vessel 200 thereby suspending the filter bag 10 from the basket lip 226 and into basket 200.

As best shown in FIGS. 4–7, connecting means 27 connects shaping means 25 to outer element 20. Preferably, connecting means 27 connects shaping means 25 to outer element 20 near outer element first end 21. Connecting means 27 comprises any suitable means for connecting filter media to the rigid shaping means 25. In the preferred embodiment, connecting means 27 comprises sewing a portion of outer element first end 21 around or to shaping means 25. Connecting means 27 may also comprise heat sealing a portion of outer element first end 21 around or to shaping means 25.

In a preferred embodiment, shaping means 25 comprises a ring 26 having a generally circular cross-section. In order for ring 26 to rest on basket lip 226, the outer diameter of ring 26 must be at least slightly larger than the cross-sectional diameter of basket 220 (and necessarily the cross-sectional diameter of outer element 20). Thus, ring 26 rests on basket lip 226 suspending filter bag 10 into basket 220.

Figures 6, 7:
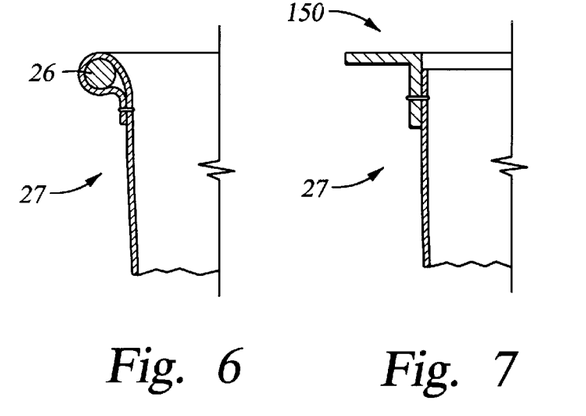
FIG. 6 is a cross-sectional view of one embodiment of the connecting means.
FIG. 7 is a cross-sectional view of another embodiment of the connecting means.
Figure 8:
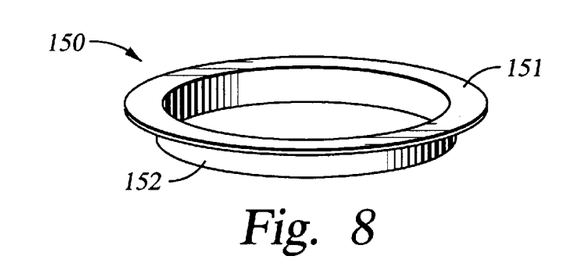
FIG. 8 is an isometric view of one embodiment of the shaping means.

In another preferred embodiment, as shown in FIGS. 7 and 8, shaping means 25 comprises an annular flange 150 having an L-shaped cross-section with the flange section 151 of annular flange 150 extending radially outward from annular section 152. In order for the flange section 151 of annular flange 150 to be able to rest on basket lip 226, the outer diameter of annular section 152 must be at least slightly smaller than the cross-sectional diameter of basket 220 and the outer diameter of flange section 151 must be at least slightly larger than the cross-sectional diameter of basket 220 (and necessarily the cross-sectional diameter of outer element 20). Thus, flange section 151 (and annular flange 150) rests on basket lip 226 suspending filter bag 10 into basket 220.

As shown in FIG. 6, in the embodiment including ring 26, connecting means 27 comprises sewing (or heat sealing) the outer element first end 21 around ring 26. As shown in FIG. 7, in the embodiment including annular flange 150, connecting means 27 comprises sewing (or heat sealing) the outer element first end 21 to the annular section 152 of annular flange 150.

Inner element 30 is constructed of suitable filter media. The types of filter media suitable for inner element 20 are the same as those suitable and described previously for outer element 20. Although not a requirement, inner element 30 is preferably constructed of the same type of filter media as outer element 30.

As best shown in FIGS. 1–5, inner element 30 is generally tubular in shape and hollow. In addition, inner element 30 includes an inner element first end 31, an inner element second end 32, an inner element outside surface 38, and an inner element inside surface 39. Inner element second end 32 is open, and inner element first end 31 is closed.

Inner element 30 is sized to be located and fit within the cylindrically shaped outer element 20. Thus, outer element inside surface 28 is adjacent inner element outside surface 38. In addition, the cross-section of inner element 30 at inner element second end 32 is preferably substantially coplanar with the cross-section of outer element 20 at outer element second end 22. Thus, inner element second end 32 is proximate to outer element second end 22. Likewise, the cross-section of inner element first end 31 is preferably coplanar with the cross-section of outer element first end 21. Thus, inner element first end 31 is proximate to outer element first end 21.

Figure 9:
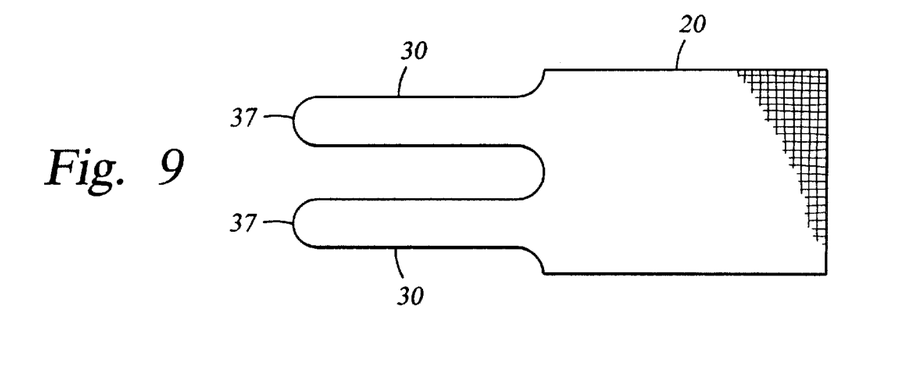
FIG. 9 is a top view of the unsewn integral piece of filter media from which the filter bag is constructed.

Preferably, inner element 30 and outer element 20 are constructed of a single piece of flexible and resilient filter media which is sewn (or heat sealed) together into the overall shape of the invention shown in the Figures and described herein. The shape of the unsewn integral piece of flexible filter media is shown in FIG. 9.

Figure 4:
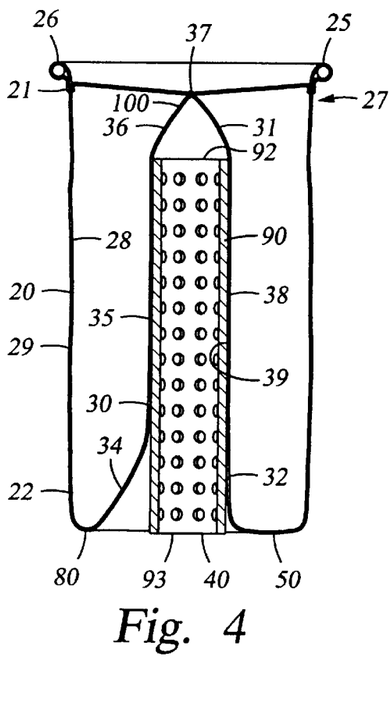
FIG. 4 is a cross-sectional view of the two element filter bag with one embodiment of inner element first section.
Figure 5:
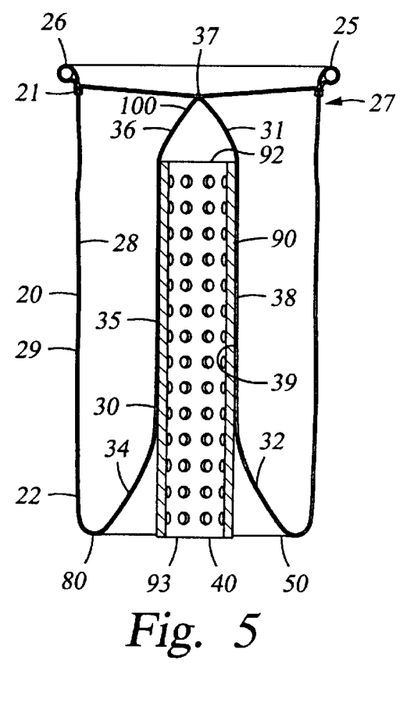
FIG. 5 is a cross-sectional view of the two element filter bag with another embodiment of inner element first section.

As shown in FIGS. 4 and 5, in the preferred embodiment, the generally tubular shape of inner element 30 can be more specifically described by dividing inner element 30 into three sections: inner element first section 34, inner element second section 35, and inner element third section 36. Inner element first section 34 includes open inner element second end 32. Inner element third section 36 includes closed inner element first end 31. Inner element second section 35 is located intermediate inner element first section 34 and inner element third section 36. Each section, 34, 35, and 36, has a slightly different shape. As shown in the Figures, inner element second section 35 constitutes the majority of inner element 30.

In the embodiment as shown in FIG. 5, the shape of inner element first section 34 is generally frustoconical with the cross-sectional diameter of section 34 decreasing from inner element second end 32 towards the junction between inner element first section 34 and inner element second section 35. Preferably, at inner element second end 32, the cross-sectional diameter of inner element first section 34 is substantially equal to the cross-sectional diameter of outer element second end 22.

In another embodiment as shown in FIG. 4, the shape of inner element first section 34 is a truncated section generally conical in shape, but having one of its vertical portions parallel to and continuing the shape of cylindrical inner element second section 35 (as will be disclosed herein). In this embodiment, the cross-sectional diameter of section 34 also decreases from inner element second end 32 towards the junction between inner element first section 34 and inner element second section 35. Also preferably, at inner element second end 32, the cross-sectional diameter of inner element first section 34 is substantially equal to the cross-sectional diameter of outer element second end 22.

Inner element second section 35 is cylindrical in shape. Thus, the cross-sectional diameter of inner element second section 35 is constant from its junction with inner element first section 34 to its junction with inner element third section 36.

Inner element third section 36 is generally conical in shape. The cross-sectional diameter of inner element third section 36 decreases in the direction distal to inner element second section 35 and towards the nose 37 of the conical shape. It should be noted that the nose 37 of inner element third section 36 coincides with inner element first end 31.

In another embodiment of inner element 30 (not shown), the entire inner element 30 is constructed in the shape of a cone. In this embodiment, the cross-sectional diameter of inner element 30 decreases from the inner element second end 32 towards the nose 37 (which coincides with inner element first end 31) of the conical shape.

As previously disclosed herein, one of the key objectives in filter bag design is to maximize the amount of filter media surface area which comes into contact with the process flow without restricting the flow of process through the filter bag 10. Thus, as a general requirement, the relative dimensions of outer element 20 to inner element 30 should be optimized to accomplish such objective. After substantial experimentation by the Applicant, it has been found that the optimum relative dimensions of outer and inner elements, 20 and 30, are as follows:

[1] the cross-sectional diameter of outer element 20 should be in the range of 1.50 to 2.00 times as large as the cross-sectional diameter of inner element second section 35; and

[2] the length of outer element 20 should be in the range of 1.10 to 1.30 times as long as the aggregate length of inner element second section 35 and inner element first section 34.

Preferably, the cross-sectional diameter of outer element 20 is 1.75 times as large as the cross-sectional diameter of inner element second section 35. Also preferably, the length of outer element 20 is 1.20 times as long as the aggregate length of inner element second section 35 and inner element first section 34. In any respect, the relative lengths of the cross-sectional diameter of outer element 20 to the cross-sectional diameter of inner element second section 35 and the relative length of outer element 20 to the aggregate length of inner element second section 35 and inner element first section 34 must be such that an annular retention volume is defined between inner element 30 and outer element 20. The remainder of the relative dimensions of the filter bag 10 necessarily follow from the disclosure limitations described herein.

Filter bag 10 also preferably includes a diverting means 100. Diverting means 100 must be located within the cylinder of outer element 20 and is preferably located proximal outer element first end 21 (the filter bag 10 inlet of the process flow). Diverting means 100 diverts the process flow around inner element outside surface 38 and within outer element inside surface 28. In this way, diverting means 100 disperses the flow uniformly throughout the filter media and along the entire length of the inner element outside surface 38 and the outer element inside surface 28.

In the preferred embodiment, diverting means 100 comprises the conically shaped inner element third section 36. In the embodiment in which the entire inner element is conical in shape (not shown), diverting means 100 comprises the nose 37 of the conical shape (which coincides with the inner element first end).

Joining means 50 sealingly joins inner element 30 to outer element 20. In the preferred embodiment, the second end 22 of outer element 20 is sealingly joined to the second end 32 of inner element 30. Preferably, as previously disclosed herein, outer element 20 and inner element 30 are constructed of one integral piece of flexible filter media. The integral filter media piece is sewn together into the shape shown in the Figures and described herein. In this preferred embodiment, joining means 50 comprises a fold 80 in the integral piece of filter media between outer element second end 22 and inner element second end 32.

In another embodiment in which outer element 20 is a separate piece from inner element 30 (not shown in the Figures), joining means 50 comprises joining the second end 22 of outer element 20 to the second end 32 of inner element 30 by sewing or heat sealing. In yet another embodiment (not shown in the Figures), joining means 50 comprises joining both the second end 22 of outer element 20 and the second end 32 of inner element 30 to a separate and independent annular structure by either sewing or heat sealing.

Supporting means 40 is positioned within and provides support to inner element 30. Supporting means 40 must be sufficiently rigid to support and maintain the structure of inner element 30 and must be sufficiently permeable to allow filtrated process flow therethrough. Supporting means 40 is preferably constructed of a rigid material with perforations or holes therein, such as perforated stainless steel, carbon steel, or polypropylene. The selection of the material from which supporting means 40 is constructed depends, among other things, on the chemistry (ie. acidity) and density of the process flow.

In addition, supporting means 40 is sized to be inserted into (through open inner element second end 32) and held tightly within inner element 30. Supporting means 40 is preferably long enough to support the entire length of inner element 30 without distorting the shape of diverting means 100. In the preferred embodiment, the length of supporting means 40 is substantially equal to the aggregate length of and inner element second section 35 and inner element third section 34. In this preferred embodiment, supporting means 40 is inserted into and fits within inner element second section 35 and inner element third section 34.

Figure 10:
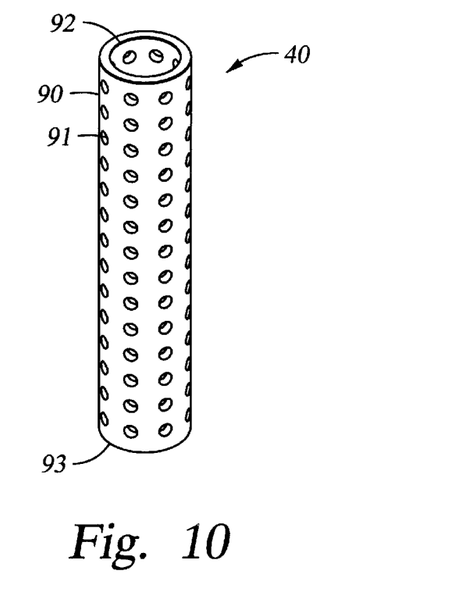
FIG. 10 is an isometric view of one embodiment of supporting means.

In a preferred embodiment as shown in FIG. 10, supporting means 40 comprises a rigid, hollow, open-ended cylinder 90 containing holes 91 to allow the passage of filtrated process flow therethrough. Although the end 92 of cylinder 90 adjacent inner element first end 31 can be closed, it is preferred that both cylinder ends, 92 and 93, be open. The end 93 of cylinder 90 adjacent inner element second end 32 must be open.

The cross-sectional diameter of cylinder 90 is preferably slightly larger than the cross-sectional diameter of inner element second section 35. Thus, when cylinder 90 is inserted into inner element 30 (and inner element second section 35) through open inner element second end 32, the flexible and resilient filter media (in the preferred embodiment) of inner element 30 stretches allowing cylinder 90 therein and thereby providing a tight fit between cylinder 90 and inner element second section 35. The tight fit serves to securely grip cylinder 90 within inner element 30. In this way, cylinder 90 securely fits within, provides sufficient support to, and is tightly held within inner element 30.

Figure 11:
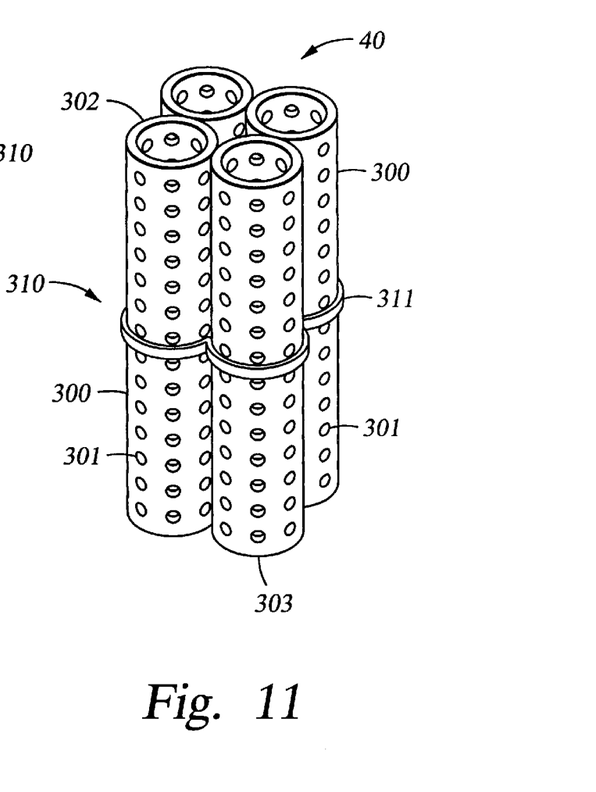
FIG. 11 is an isometric view of another embodiment of supporting means.

In another preferred embodiment as shown in FIG. 11, supporting means 40 comprises a plurality of cartridges 300 which are rigid, hollow, and open-ended and which contain holes 301 to allow the passage of filtrated process flow therethrough. Although the end 302 of each cartridge 300 adjacent inner element first end 31 can be closed, it is preferred that both cartridge ends, 302 and 303, be open. The end 303 of cartridge 300 adjacent inner element second end 32 must be open.

Figure 12:
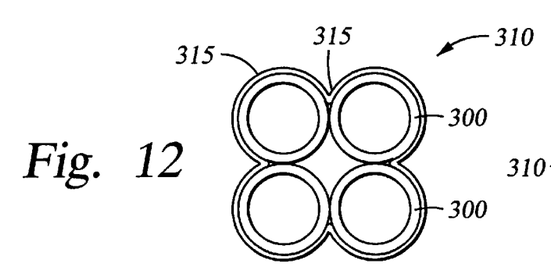
FIG. 12 is a top view of the supporting means embodiment of FIG. 11.

The plurality of cartridges 300 are attached together by a cartridge attachment means 310. Preferably, cartridge attachment means 310 comprises a polypropylene ring 311 welded unto the plurality of cartridges 300. As shown in FIG. 12, the cross-section of the plurality of cartridges 300 (as attached together by cartridge attachment means 310) is slightly larger than the cross-sectional diameter of inner element second section 35. Thus, when the cartridges 300 are inserted into inner element 30 (and inner element second section 35) through open inner element second end 32, the flexible and resilient filter media (in the preferred embodiment) of inner element 30 stretches allowing the cartridges 300 therein and thereby providing a tight fit between inner element second section 35 and cartridges 300. The tight fit serves to securely grip cartridges 300 within inner element 30. In this way, the plurality of cartridges 300 securely fit within, provide sufficient support to, and are tightly held within inner element 30.

In addition, the tight fit between the cartridges 300 and inner element 30 together with the irregular cross-sectional shape defined by their attachment creates ridges 315 on inner element 30 (along the longitudinal length of the plurality of cartridges 300) once the cartridges 300 are positioned within the inner element 30. The ridges 315 serve to provide more filter media surface area to inner element 30.

Also preferably, supporting means 40 comprises four cartridges 300. Cartridge attachment means 310 attaches the four cartridges 300 together so that the cross-section of the cartridges 300, as shown in FIG. 12, is generally diamond in shape.

Figure 13:
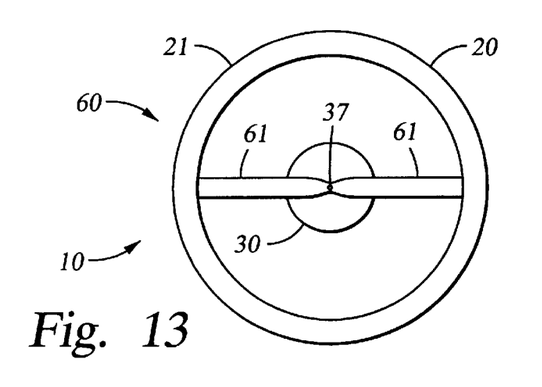
FIG. 13 is a top view of the two element filter bag showing the preferred embodiment of securing means.

As shown in FIG. 13, filter bag 10 also preferably includes a securing means 60. Securing means 60 secures the relative position of inner element 30 to outer element 20 and is preferably constructed of the same filter media material as the outer element 20 and/or the inner element 30. In the preferred embodiment, securing means 60 comprises a plurality of attachment strips 61. Attachment strips 61 attach the closed inner element first end 31 to the open outer element first end 21.

IN OPERATION

Generally, in operation, a pressurized process flow enters filter vessel 200 through process flow inlet 206, passes into container 204 through container top opening 213, passes through filter bag 10 and basket 220, and exits filter vessel 200 through process flow outlet 210. Solid particles in the process flow that are too large to pass through the filter media are retained within filter bag 10. All other particles (including liquid) permeate through filter bag 10. Thus, the process flow is filtered as it passes through filter bag 10.

After passing through process flow inlet 206, the process flow enters container 204 through container top opening 213. Because filter bag 10 is suspended on basket lip 226 and basket lip 226 is suspended on container top surface groove 214, filter bag 10 encircles the entire container top opening 213. Thus, all process flow entering filter vessel 200 necessarily passes through and is filtered by filter bag 10.

The flow enters filter bag 10 through open outer element first end 21 and collides with closed inner element first end 31 and diverting means 100. Diverting means 100, which corresponds to the conically shaped inner element third section 36 and includes closed inner element first end 31 in the preferred embodiment, diverts the flow around inner element outside surface 38 and within outer element inside surface 28. Diverting means 100 uniformly diverts the process flow around nose 37 of inner element third section 36 throughout the filter media and along the entire length of inner element outside surface 38 and outer element inside surface 28. Thus, diverting means 100 ensures that the growth of the layer of solids within the filter bag 10 is uniform throughout the length of the filter bag 10. As has been previously disclosed, the utilization of the entire length of the filter bag 10 prolongs the usable life of the filter bag 10.

In addition, because inner element third section 36 is conically shaped, the process flow flows easily and without restriction around nose 37 of inner element 30. Thus, filter bag 10 utilizes a greater amount of filter media surface area (inner element 30) than comparably sized prior art filter bags without inhibiting the flow of the process through filter bag 10.

After being diverted by diverting means 100, the flow collides with outer element inside surface 28 and/or inner element outside surface 38. Due to the presence of rigid supporting means 40, inner element 30 does not collapse when the pressurized flow collides with inner element outside surface 38.

The collision impact of the pressurized flow on the outer element inside surface 28 causes filtrate to pass through the filter media from the inside surface 28 to the outside surface 29 of outer element 20. Likewise, the collision impact of the pressurized flow on the inner element outside surface 38 causes filtrate to pass through the filter media from the outside surface 38 to the inside surface 39 of inner element 30.

Any solid particles in the process flow which are nonfiltratable collect within the filter bag 10 on the inside surface 28 of outer element 20 and on the outside surface 38 of inner element 30. Thus, the process flow is filtered by filter bag 10.

After passing through the filter media of inner element 30, filtrate passes through the permeable supporting means 40. In the preferred embodiment including cylinder 90, after passing through the filter media of inner element 30, filtrate passes through the holes 91 of cylinder 90 and exits cylinder 90 through open cylinder end 93. In the preferred embodiment including cartridges 300, filtrate passes through the holes 301 of cartridges 300 and exists cartridges 300 through open cartridge ends 303.

After passing through supporting means 40, filtrate then permeates through permeable basket 220 and flows towards container bottom 208. Filtrate exits filter vessel 200 through process flow outlet 210.

An operator may elect to clean the filter bag 10 by reversing the direction of the process flow thereby dislodging the nonfiltratable solid matter which has accumulated, through use, on inner element outside surface 38 and on outer element inside surface 28. If the direction of the flow is reversed, then the process flow enters filter vessel 200 through process flow outlet 210 and exits filter vessel 200 through process flow inlet 206. The process flow will thus permeate through outer element 20 from its outside surface 29 to its inside surface 28 and through inner element 30 from its inside surface 39 to its outside surface 38. In such a reverse flow condition, supporting means 40 provides structure to and prevents the collapse of the filter bag 10. Thus, supporting means 40 also allows for the backwash of filter bag 10.

To replace filter bag 10, an operator must first remove filter vessel lid 202 from filter vessel container 204 by detaching lid attachment means 212. Once filter vessel lid 202 is detached, the operator may then lift old filter bag 10 (with or without also removing basket 220) from filter vessel container 204 and replace it with a new filter bag 10. If filter bag 10 includes attachment strips 61 (the preferred embodiment of securing means 60), then the operator may lift old filter bag 10 and replace new filter bag 10 by clutching the attachment strips 61.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A filter bag for filtering a process flow, comprising:

a hollow cylindrical outer element constructed of filter media including an open first end and an open second end;

said outer element including an outer element inside surface, said outer element inside surface having a length;

a hollow tubular inner element constructed of filter media including a closed first end and an open second end;

said inner element including an inner element outside surface, said inner element outside surface having a length;

said inner element positioned within said outer element so that said outer element first end is proximate said inner element first end, so that said outer element second end is proximate said inner element second end, and so that said inner element outside surface is proximate said outer element inside surface;

means for sealingly joining said outer element second end to said inner element second end;

said outer element first end and said inner element first end proximate the inlet of said process flow;

said outer element second end and said inner element second end proximate the outlet of said process flow;

said process flow entering said filter bag through said outer element open first end and filtering through said inner element outside surface and said outer element inside surface;

means for diverting said process flow within said filter bag;

said diverting means positioned within said outer element; and said diverting means diverting said process flow so that said process flow is dispersed and is filtered along said lengths of said outer element inside surface and said inner element outside surface.

2. A filter bag as in claim 1, wherein:

said inner element having a cross-section;

said outer element having a cross-section;

said inner element cross-section at said inner element first end is substantially coplanar with said outer element cross-section at said outer element second end; and said inner element cross-section at said inner element second end is substantially coplanar with said outer element cross-section at said outer element second end.

3. A filter bag as in claim 2, wherein:

said inner element including a conically shaped inner element section;

said conically shaped inner element section including a nose;

said inner element closed first end coinciding with said nose; and said diverting means comprising said conically shaped inner element section.

4. A filter bag for filtering a process flow, comprising:

a hollow cylindrical outer element constructed of filter media including an open first end and an open second end;

said outer element including an outer element inside surface, said outer element inside surface having a length;

a hollow tubular inner element constructed of filter media including a closed first end and an open second end;

said inner element including an inner element outside surface, said inner element outside surface having a length;

said inner element positioned within said outer element so that said outer element first end is proximate said inner element first end, so that said outer element second end is proximate said inner element second end, and so that said inner element outside surface is proximate said outer element inside surface;

said inner element having a cross-section;

said outer element having a cross-section;

said inner element cross-section at said inner element first end is substantially coplanar with said outer element cross-section at said outer element second end;

said inner element cross-section at said inner element second end is substantially coplanar with said outer element cross-section at said outer element second end;

means for sealingly joining said outer element second end to said inner element second end;

said process flow entering said filter bag through said outer element open first end and filtering through said inner element outside surface and said outer element inside surface;

means for diverting said process flow within said filter bag;

said diverting means positioned within said outer element;

said diverting means diverting said process flow so that said process flow is dispersed and is filtered along said lengths of said outer element inside surface and said inner element outside surface;

said inner element including a conically shaped inner element section;

said conically shaped inner element section including a nose;

said inner element closed first end coinciding with said nose;

said diverting means comprising said conically shaped inner element section; and said inner element further comprising a cylindrically shaped inner element section positioned intermediate said conically shaped inner element section and said inner element second end.

5. A filter bag as in claim 4, wherein:

said inner element further comprising a frustoconically shaped inner element section; and said frustoconically shaped inner element section adjacent said cylindrically shaped inner element section and coinciding with said inner element second end.

6. A filter bag as in claim 4, wherein:

said outer element cross-section having a diameter and a length;

said inner element cross-section having a diameter;

said outer element cross-sectional diameter being sufficiently larger than said inner element cross-sectional diameter at said cylindrically shaped inner element section; and said outer element length being sufficiently longer than the distance from said inner element second end to the junction between said cylindrically shaped inner element section and said conically shaped inner element section;

such that an annular retention volume is defined between said inner element and said outer element.

7. A filter bag as in claim 6, wherein:

said outer element cross-sectional diameter is 1.50 to 2.00 times larger than said inner element cross-sectional diameter at said cylindrically shaped inner element section; and said outer element length is 1.10 to 1.30 times longer than the distance from said inner element second end to the junction between said cylindrically shaped inner element section and said conically shaped inner element section.

8. A filter bag as in claim 4, wherein:

said inner element and said outer element constructed from one integral piece of flexible filter media;

said joining means comprising a fold in said integral flexible filter media piece; and said fold located between said outer element second end and said inner element second end thereby joining said outer element second end to said inner element second end.

9. A filter bag as in claim 8, further comprising:

means for supporting said inner element;

said supporting means positioned within said inner element; and said supporting means constructed from a rigid, permeable material.

10. A filter bag as in claim 9, wherein:

said supporting means having a length and a cross-sectional diameter;

said supporting means length is substantially equal to the distance from said inner element second end to the junction between said cylindrically shaped inner element section and said conically shaped inner element section; and said supporting means cross-sectional diameter is slightly larger than said inner element cross-sectional diameter at said cylindrically shaped inner element section.

11. A filter bag as in claim 10, wherein:

said supporting means comprising a hollow cylinder having holes therethrough;

said cylinder having at least one open end; and said at least one open end located proximate said inner element second end when said hollow cylinder is positioned within said inner element.

12. A filter bag as in claim 10, wherein:

said supporting means comprising a plurality of hollow cartridges having holes therethrough;

means for attaching said plurality of cartridges together;

each of said plurality of cartridges having at least one open end; and each of said at least one open end located proximate said inner element second end when said plurality of cartridges are positioned within said inner element.

13. A filter bag as in claim 10, further comprising:

means for shaping said outer element thereby providing and maintaining said cylindrical shape to said outer element;

said shaping means constructed from a rigid material; and means for connecting said shaping means to said outer element.

14. A filter bag as in claim 13, wherein:

said shaping means comprising a rigid ring having an outer diameter slightly larger than said outer element cross-sectional diameter; and said connecting means comprising sewing said outer element first end around said ring.

15. A filter bag as in claim 13, wherein:

said shaping means comprising an annular flange including a flange section and an annular section;

said flange section extending radially outward from said annular section;

said flange section having an outer diameter slightly larger than said outer element cross-sectional diameter; and said connecting means comprising sewing said outer element first end to said annular section of said annular flange.

16. A filter bag as in claim 13, further comprising:

means for securing the relative position of said inner element to said outer element.

17. A filter bag as in claim 16, wherein:

said securing means comprising a plurality of attachment strips constructed from flexible filter media; and each of said plurality of attachment strips attached at one end to said outer element first end and at a second end to said inner element first end.

* * * * *